June 12, 1962

R. A. LOOS ETAL 3,038,999

METHOD AND APPARATUS FOR LOADING AND
HANDLING A RADIOACTIVE SOURCE

Filed May 18, 1959

INVENTORS
ROBERT A. LOOS
SIMON H. JOHNSON
BY Raymond P. Wallace
AGENT

INVENTORS
ROBERT A. LOOS
SIMON H. JOHNSON
BY Raymond P. Wallace
AGENT

INVENTORS
ROBERT A. LOOS
SIMON H. JOHNSON
BY Raymond P. Wallace
AGENT

INVENTORS
ROBERT A. LOOS
SIMON H. JOHNSON
BY Raymond P. Wallace
AGENT

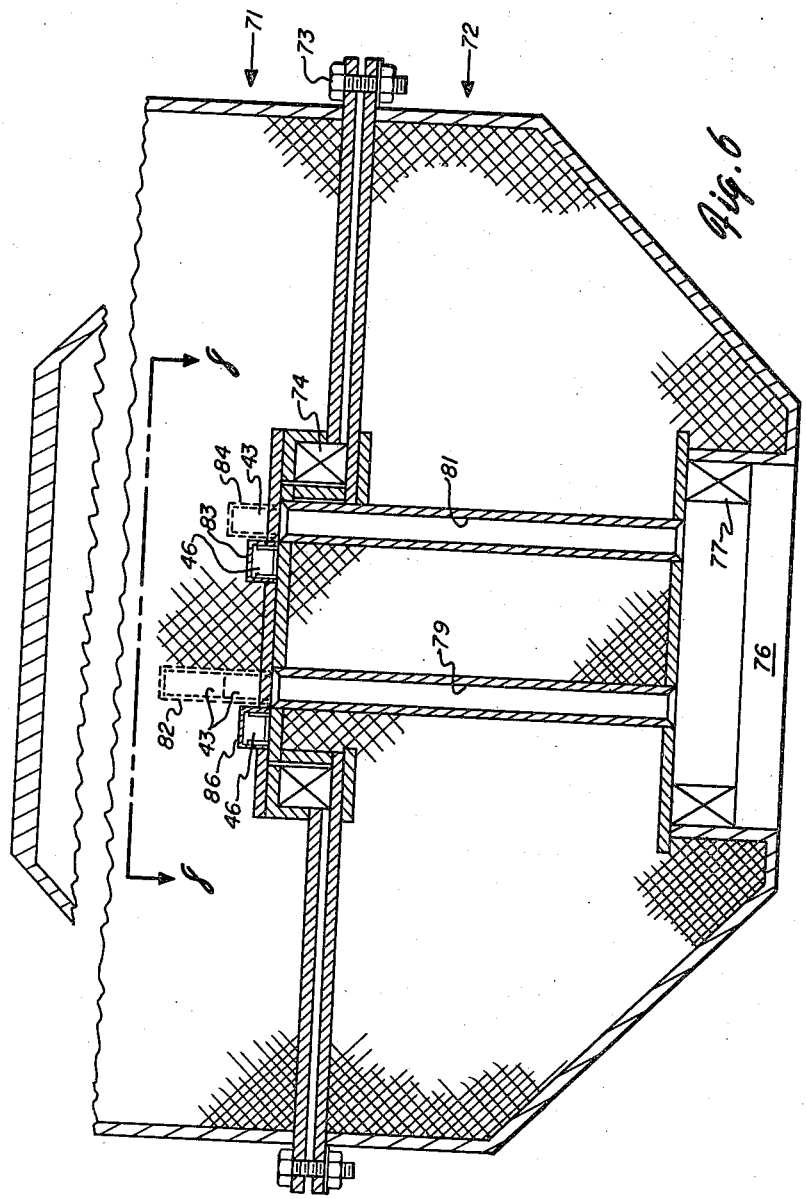

June 12, 1962
R. A. LOOS ETAL  3,038,999
METHOD AND APPARATUS FOR LOADING AND
HANDLING A RADIOACTIVE SOURCE
Filed May 18, 1959
6 Sheets-Sheet 6
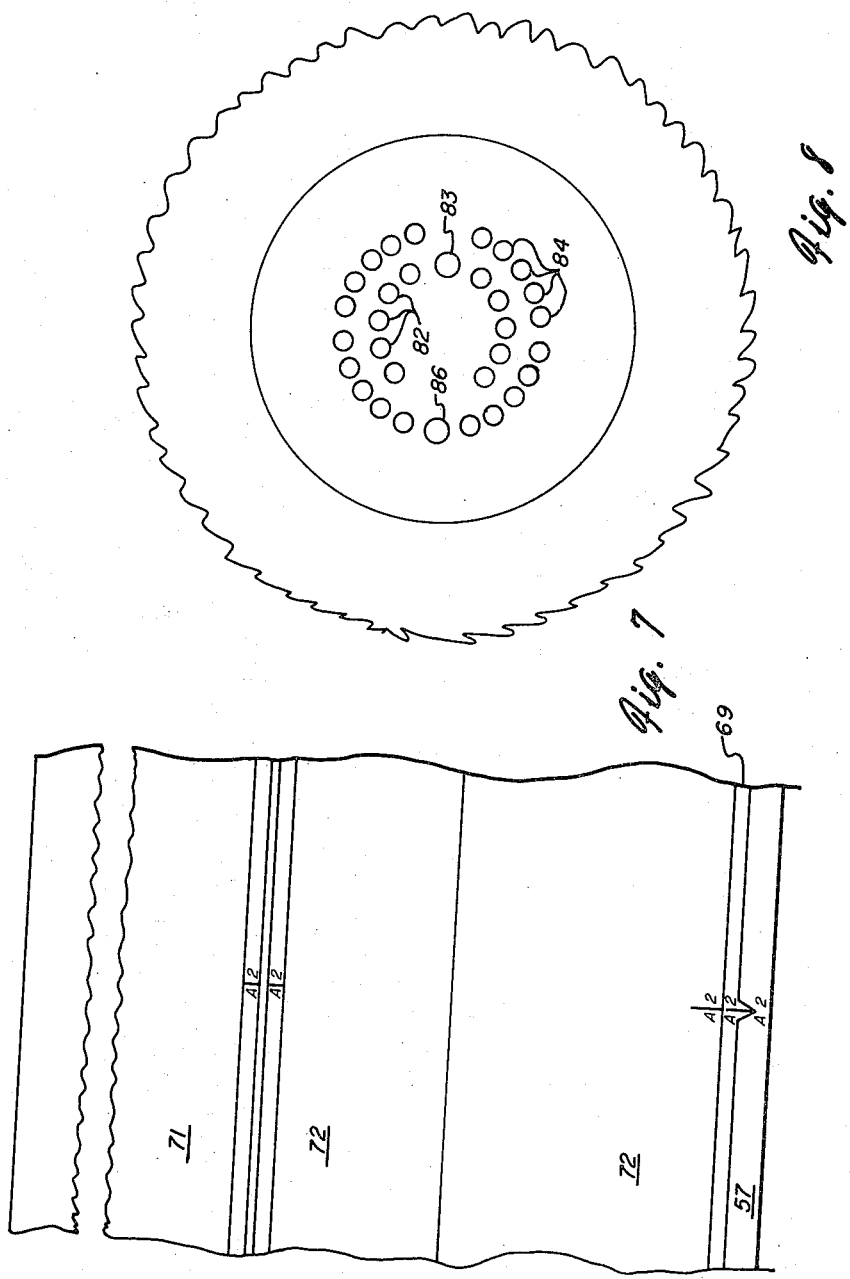
INVENTORS
ROBERT A. LOOS
SIMON H. JOHNSON
BY Raymond P. Wallace
AGENT

United States Patent Office 3,038,999
Patented June 12, 1962

3,038,999
METHOD AND APPARATUS FOR LOADING AND HANDLING A RADIOACTIVE SOURCE
Robert A. Loos, Karthaus, and Simon H. Johnson, Clearfield, Pa., assignors to Curtiss-Wright Corporation, a corporation of Delaware
Filed May 18, 1959, Ser. No. 813,956
Claims priority, application Brazil May 20, 1958
5 Claims. (Cl. 250—106)

The present invention pertains to a method and apparatus for loading and handling a radioactive source, and more particularly, to a storing and shipping container for cobalt-60 and to a method of loading a source from the container.

In the embodiment to be described the container and its method of operation are primarily adapted to storing and shipping cylindrical canned pellets of cobalt-60 and loading them into a source for a food-irradiating device such as will be hereinafter described, but in the broad sense the invention is adapted to storing and shipping any bodies or slugs of radioactive material and to delivering them as required.

It is therefore an object of the present invention to provide a safe storing and shipping container for radioactive material.

It is another object to provide a container for radioactive material adapted to deliver individual slugs thereof.

A further object of this invention is the provision of a container for radioactive material adapted to deliver slugs thereof in a preselected pattern.

Still another object is the provision of a method of loading a radioactive source while maintaining adequate shielding.

The foregoing objects and advantages, and others ancillary thereto will be better understood on reading the following specification in connection with the accompanying drawings, in which FIGURE 1 is an elevational view, partly in cross-section, of a grain-irradiating unit containing a source which the present invention is adapted to service;

FIGURE 6 is a fragmentary elevational view in cross-section of the shipping container and loading device of the preesnt invention;

FIGURE 7 is a fragmentary view showing details of assembly of the container of FIGURE 6 with the cask plug of FIGURE 4; and FIGURE 8 is a fragmentary internal view taken on line 8—8 of FIGURE 6.

Figure 1:
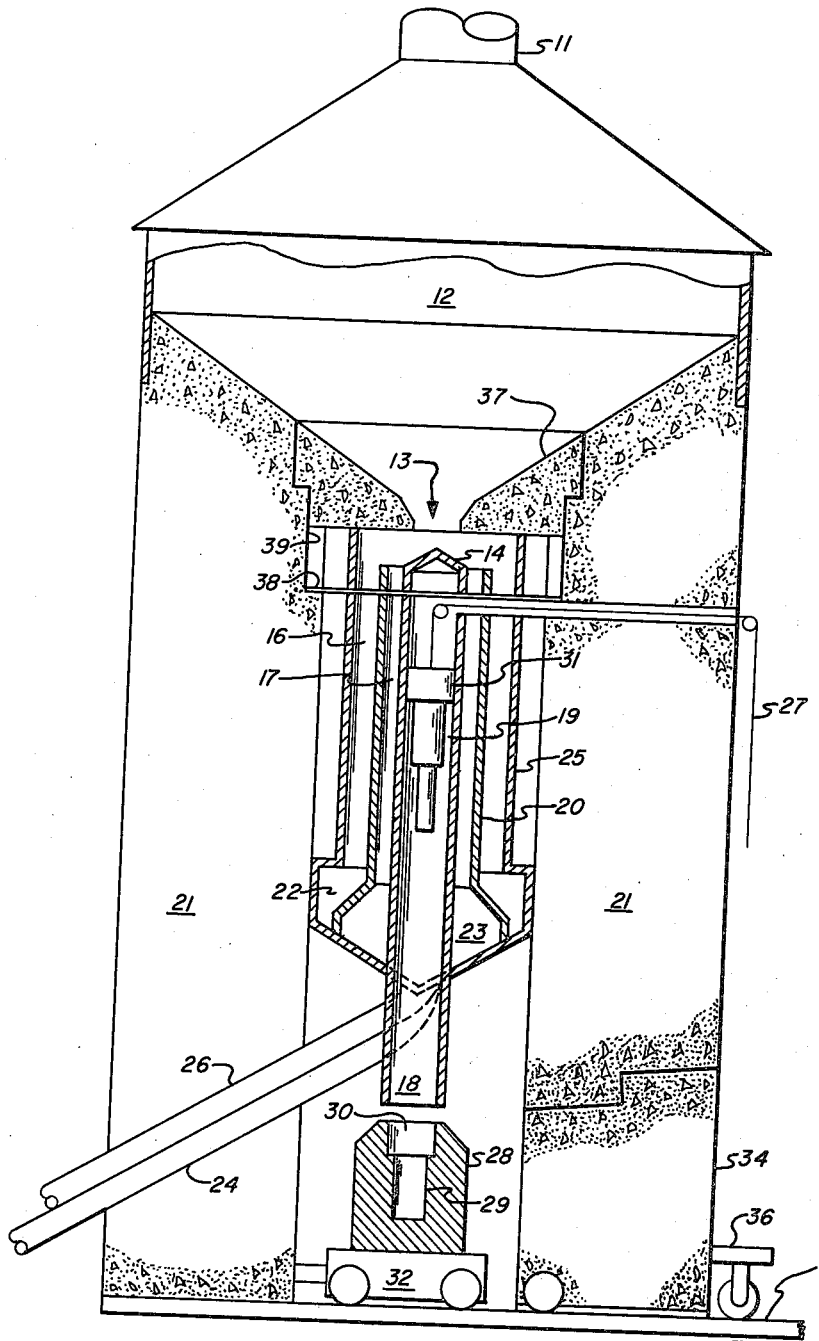

For convenience in describing and illustrating a specific embodiment of the present invention, there will first be described an irradiating device employing a source which this invention is designed to load. Reference is made to FIGURE 1 which shows a unit designed for irradiating foodstuffs such as grain, nuts, coffee beans, or the like with gamma radiation from cobalt-60 ($Co^{60}$) to destroy pest infestation therein. Gamma radiation of proper intensity will break the life-cycle of the various organisms that infest food materials, either killing the organism itself, the egges, or the larvae without injuring the food. For instance, it is calculated that a total irradiation of 10,000 to 30,000 rep. (roentgen equivalent physical) is sufficient to de-infest wheat; irradiation values for other foods are determinable by the kinds of pests found therein.

As shown in FIGURE 1, wheat (as an example) is fed by gravity through intake 11 into hopper 12. From the hopper it flows by gravity through opening 13 and strikes the conical deflection hood 14, which diverts it into the double concentric annulus of the flow chamber, comprising an outer annular chamber 16 and an inner annular chamber 17. A central tubular well 18 contains the radioactive source 19. Gamma radiation streaming outwardly from the source passes through the metal walls of tubes 20 and 25 defining the annuli and irradiates the wheat as the grain passes. Massive concrete walls 21 act as a shield to prevent radiation from penetrating therethrough to personnel outside.

Wheat passing through annulus 16 drops into chamber 22, and wheat passing through annulus 17 drops into chamber 23. Chambers 22 and 23 communicate with discharge tubes 24 and 26 respectively. As the wheat passing through the outer annulus 16 is farther from the radioactive source 19, it receives irradiation at a slower rate than that passing through the inner annulus, since the intensity of radiation varies inversely as the square of the distance. Therefore, wheat in the outer annulus must move more slowly than that in the inner annulus to receive the same amount of irradiation. The two flow rates are controlled and adjusted by means of discharge shutters (not shown) in the discharge tubes.

When the machine is not in operation the source 19 may be lowered by means of the hoisting mechanism 27 into the lead storage cask 28 at the bottom of the device. The lower portion of the source telescopes into the upper section, so that the entire source will be contained in chamber 29 of the lead cask, and will be covered by the lead plug 31 (FIGURE 4) to which the source is fastened and by which it is hoisted; the plug seats in chamber 30 of the cask above the source chamber.

Cask 28 is provided with a car 32 running on rails 33, for removal from the irradiating machine, after removal of the concrete wall plug 34, which has a built-in car 36 running on rails 33. A removable concrete ring 37 is provided at the bottom of hopper 12, in order to remove the flow chamber assembly, which is suspended from a four-armed spider 38 resting in niches 39 in the concrete wall.

Figure 2:
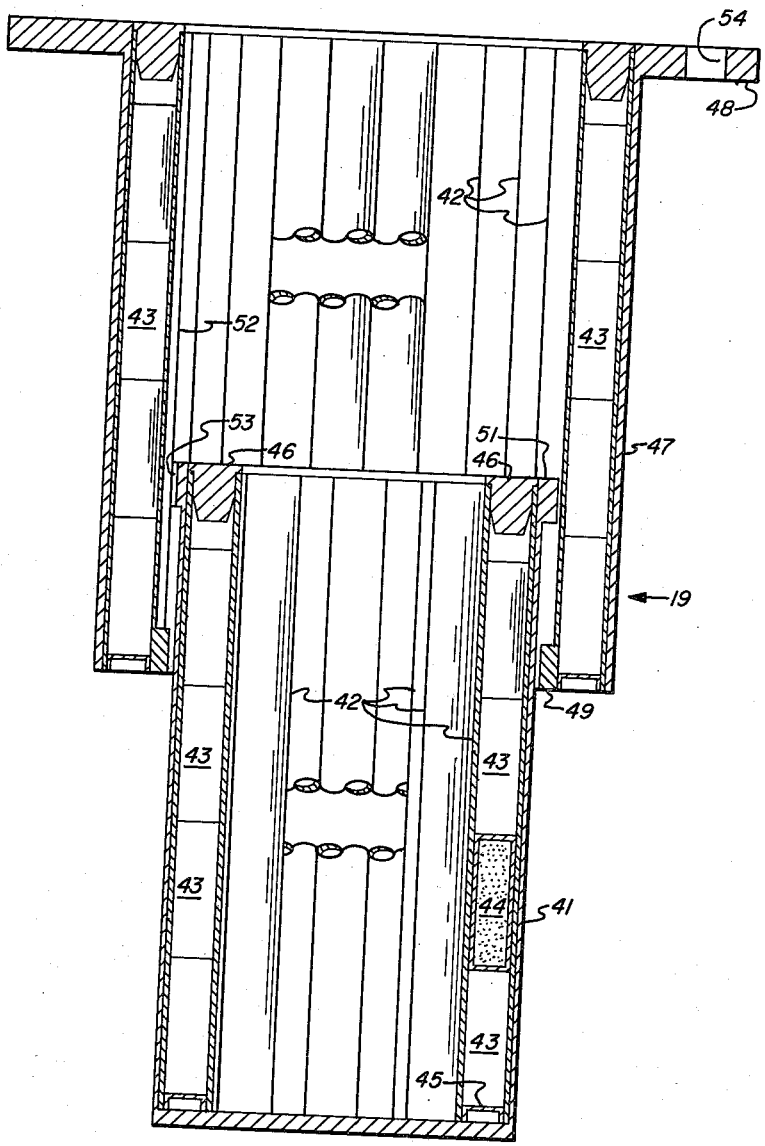
FIGURE 2 is an enlarged elevation in cross-section of said source.

Referring now to FIGURE 2, there is shown an elevational view in cross-section of the source 19 in partially telescoped position. A metal cylinder 41 which is closed at the bottom contains two concentric circular rows (see FIGURE 3) of tubes 42 which are preferably formed of aluminum, but may also be of any material which is relatively permeable to radiation, such as another metal or plastic. Each tube contains a plurality of slugs 43 of cobalt-60. In a preferred embodiment each slug is a sealed aluminum cylinder containing radioactive cobalt 44; however, the slugs may also be compacted bodies of radioactive material without sheathing, or they may be sheathed with other materials. The tubes 42 are sealed at the bottom ends by closure members 45 pressed or welded in place or otherwise conveniently retained, and at the top ends by tapered plugs 46 pressed in place, the plugs being formed of lead, solder, plastic, or other deformable material.

The tubes of the outermost circle within cylinder 41 are welded to the wall thereof, and the tubes of the inner circle are welded to those of the outer circle, so that all are held rigidly in place. Surrounding cylinder 41 is a second and larger cylinder 47 having an external flange 48 at the top. Welded to the inner periphery of cylinder 47 is a third circle of tubes 42 each containing a plurality of radioactive slugs 43, the whole being of such diameter that cylinder 41 will slide easily within the third circle of tubes. An annulus 49 is welded to the inner sides of the third circle of tubes at the bottom thereof; cylinder 41 is provided with a flange 51 at the top, of such diameter that when cylinder 51 is lifted, cylinder 41 will slide downward to its full extension, cylinder 41 coming to rest on annulus 49 and holding the flange 51 from dropping further. A vertical key 52 is welded to one of the tubes in the third circle, mating with a keyway 53 in flange 51, whereby cylinder 41 is prevented from rotating in cylinder 47 (better shown in FIGURE 3).

Figure 3:
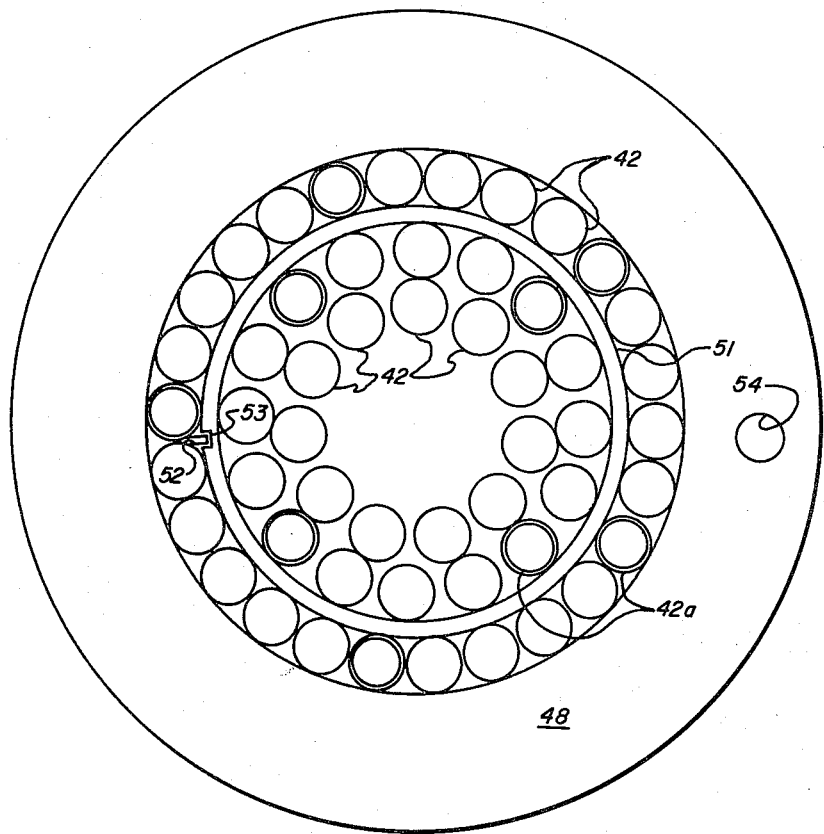
FIGURE 3 is a plan view of the source shown in FIGURE 2.
Figure 5:
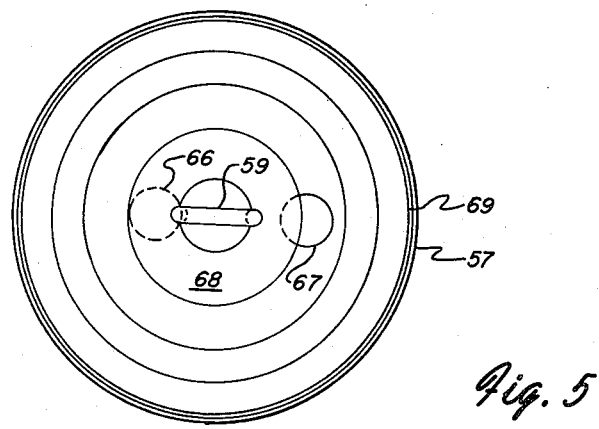
FIGURE 5 is a plan view of the cask plug shown in FIGURE 4.

FIGURE 3 shows the concentric arrangement of the two cylinders and of the three circles of tubes 42, and the key 52 with its mating keyway 53. Also shown are a plurality of tubes 42a, in the example shown numbering five in the third circle and four in the second circle. Tubes 42a are open at their top ends and do not contain radioactive material at the beginning of the operation, but are to be filled later one by one with the use of the present invention as the activity of the source decays, owing to the normal half-life of cobalt-60 of approximately five years. Aperture 54 is provided in flange 48 for a key to lock the source against rotation when positioned in the lead cask 28 (better shown in FIGURE 4).

Figure 4:
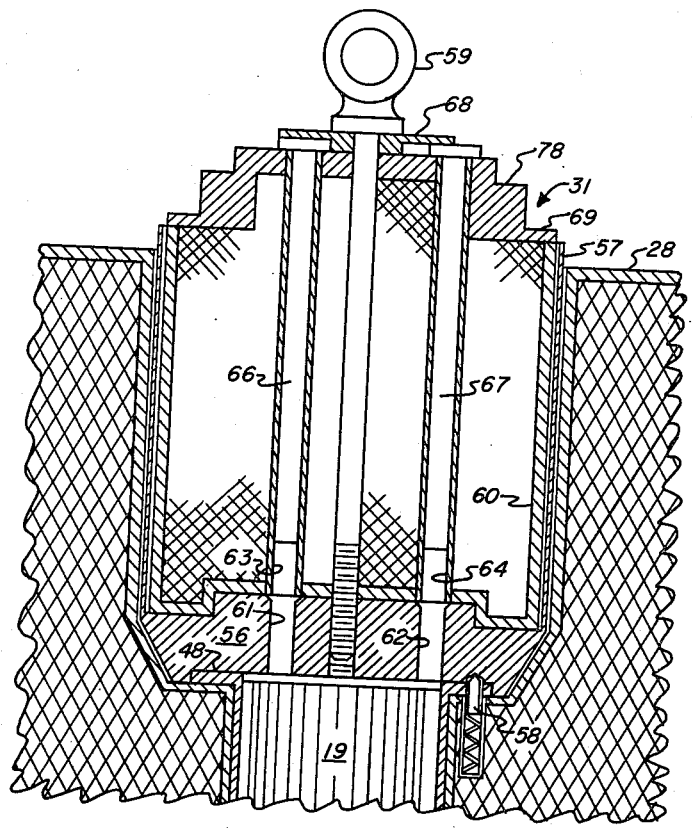
FIGURE 4 is a view showing in cross-section a fragment of a storage cask and plug suitable for said source and for use with the present invention.

Referring now to FIGURE 4, there is shown a fragmentary view of the upper portion of cask 28 containing the source and closed by plug 31. The plug comprises a steel base plate 56 having an upwardly extending external cylindrical sleeve 57. Flange 48 of the source is welded or otherwise fastened to the bottom of base plate 56, so that when the plug is hoisted from the cask the source will be lifted with it. A spring-loaded pin 58 is provided in the cask adjacent to the source, mating with aperture 54 (shown in FIGURE 3) in the source flange to prevent the source from being rotatable when in position in the cask. Base plate 56 is threaded for eyebolt 59 passing axially entirely through plug 31, whereby the plug and source may be hoisted from the cask.

Base plate 56 is provided with a circle of holes 61 exactly matching in number and disposition the tubes in the second circle of the source, and of suitable diameter to allow pellets 43 to drop through. Another circle of holes 62 is provided in the base plate matching the third circle of tubes in the source.

The top portion of plug 31 is a closed metal casing 60 filled with lead and fitting within sleeve 57, and when eyebolt 59 is removed it is rotatable within sleeve 57 on the upper surface of base plate 56. This top portion of the plug is provided with two vertical tubular apertures therethrough, aperture 63 being so spaced as to be serially rotatable over the circle of apertures 61 in the base plate, and aperture 64 being spaced to be rotatable over the circle of apertures 62 in the base plate. Normally apertures 63 and 64 are filled by headed lead dowels 66 and 67 extending substantially the full depth of the top portion of the plug. The dowels are retained in place by a cap 68 over their heads, the cap being held down by the eyebolt. Sleeve 57 and flange 69 of the top of the plug are each provided with a series of index marks (shown in FIGURE 7) by means of which apertures 63 and 64 can be aligned with any selected pair of apertures in the base plate when the top portion of the plug is rotated within the sleeve.

FIGURE 6 shows a shipping container and loading device for radioactive materials, to be used in connection with plug 31 to load pellets 43 or similar materials into the tubes 42a of source 19. The shipper and container comprises an upper half 71 and a lower half 72, both halves being steel sheathings filled wtih lead; during shipping and handling they are secured fastened together, as by bolts 73, clamps, or other convenient means. When the container is assembled it is generally cylindrical in shape, but frustoconically tapered at top and bottom in order to save weight.

The top half 71 is provided with an axially located circular recess in its lower, mating face, containing an annular ball-bearing 74 rendering it rotatable on the lower half when bolts 73 are removed. Lower half 72 is provided with an axially located recess 76 in its lower surface, containing an annular ball-bearing 77. Recess 76 is adapted to mate with the top portion of plug 31, bearing 77 resting on surface 78 of the plug, whereby the entire container is rotatable on top of the plug.

Lower half 72 has two tubes extending vertically therethrough, tube 79 being so spaced as to be alignable with tube 63 in plug 31, and tube 81 being spaced to be alignable with tube 64 in plug 31. Appropriate index marks (shown in FIGURE 7) are placed on member 72 to match those on the plug in order to insure alignment.

Upper member 71 is provided wtih a plurality of tubular recesses 82 open on the lower face of the member and distributed on a circle of such diameter as to bring their openings successively adjacent to the upper end of tube 79 when the upper member is rotated on the lower member. Recesses 82 contain slugs 43 which may thus be successively dropped through tube 79, tube 63, and aperture 61 into a selected tube 42a of the source when the container is positioned on plug 31 and appropriate index marks on the various elements are placed in registration. A single recess 83 on the same circle as recesses 82 contains a lead plug 46 which is then dropped to close tube 42a. There is also provided a second plurality of recesses 84 containing an additional supply of radioactive slugs and located on a circle of such diameter as to bring their openings successively adjacent to the upper end of tube 81 when the upper member 71 is rotated, whereby another tube 42a on the larger circle may be filled. Another recess 86 is provided on the circle of recesses 84, and contains another plug 46 which closes the second tube to be filled. Index marks (shown in FIGURE 7) are provided at the periphery of the adjoining faces of members 71 and 72, whereby proper alignment can be achieved.

FIGURE 7 shows a portion of the exterior of sleeve 57 of plug 31, flange 69, member 72, and member 71 with one set of index marks designated A2 in alignment for loading.

FIGURE 8 shows the positioning of recesses 82 and 84 containing pellets, and recesses 83 and 86 containing plugs. In this embodiment the outer circle contains twenty recesses 84 each containing a single slug; hence as many as twenty slugs may be loaded into a single tube 42a by rotating member 71 in one direction until ten are dropped, then in the opposite direction until the remaining ten are dropped, and then continuing rotation one position further to drop the plug 46. A similar procedure is followed in loading from the inner circle of recesses 82, but since this circle is of smaller diameter it contains fewer positions, and recesses 82 may contain two pellets each, as shown in FIGURE 6. Each circle of recesses has a blank position, and except during the actual loading operation members 71 and 72 are fastened together with these blank spaces positioned above tubes 79 and 81, so that no slugs can drop. It will be apparent that the actual number of slug-containing recesses on either circle may vary according to choice, and also that the recesses may be of such dimension that any desired number of slugs may be contained in each.

Although the method and apparatus of this invention for shipping and storing radioactive materials and loading them into a source have been described above in a particular embodiment, it will be obvious that various changes and modifications may be made without departing from the scope of the invention. It is intended to cover all such modifications in the appended claims.

What is claimed is:

1. A container for radioactive materials, comprising in combination an upper member and a lower member having mating faces, said upper member being rotatable on the mating face of said lower member, said upper member having therein a first circle of chambers for radioactive material opening on the mating face thereof and a second circle of said chambers concentric with said first circle and opening on said mating face, said lower member having a first aperture therethrough sequentially alignable with the chambers of said first circle and a second aperture therethrough sequentially alignable with the chambers of said second circle.

2. A container for radioactive materials as in claim 1, wherein said upper and lower members have external indicia thereon adapted to align said chambers with said apertures.

3. A container for radioactive materials as in claim 1, wherein each of said circles has a blank position, said blank positions being simultaneously alignable with said apertures.

4. In combination with a source for radioactive materials having slug-containers circularly disposed, apparatus for loading radioactive slugs into said containers comprising in combination an upper member and a lower member having mating faces, said upper member being rotatable on the mating face of said lower member, said upper member having therein a plurality of chambers adapted to contain radioactive slugs disposed on a circle congruent with the circle of containers in said source, said chambers opening on the mating face of said upper member, said lower member having an aperture therethrough sequentially alignable with said chambers and alignable with a selected one of said containers, whereby said slugs may be successively dropped from said loading apparatus into said selected container.

5. The combination recited in claim 4, wherein said upper and lower members and said source have external indicia thereon adapted to align said chambers and said aperture with said selected container.

References Cited in the file of this patent

UNITED STATES PATENTS 2,514,909  Strickland _____ July 11, 1950